US012722188B2

(12) United States Patent
Wada et al.

(10) Patent No.: US 12,722,188 B2
(45) Date of Patent: Sep. 1, 2026

(54) PURGE DEVICE

(71) Applicant: Murata Machinery, Ltd., Kyoto (JP)

(72) Inventors: Yoshiya Wada, Ise (JP); Yasuhisa Ito, Inuyama (JP); Takashi Yamaji, Ise (JP)

(73) Assignee: Murata Machinery, Ltd., Kyoto (JP)

( * ) Notice: Subject to any disclaimer, the term of this patent is extended or adjusted under 35 U.S.C. 154(b) by 364 days.

(21) Appl. No.: 18/694,099

(22) PCT Filed: Jul. 20, 2022

(86) PCT No.: PCT/JP2022/028214
§ 371 (c)(1),
(2) Date: Mar. 21, 2024

(87) PCT Pub. No.: WO2023/053685
PCT Pub. Date: Apr. 6, 2023

(65) Prior Publication Data
US 2024/0390954 A1 Nov. 28, 2024

(30) Foreign Application Priority Data
Oct. 1, 2021 (JP) ................................ 2021-163097

(51) Int. Cl.
*B08B 5/02* (2006.01)

(52) U.S. Cl.
CPC .................................... *B08B 5/02* (2013.01)

(58) Field of Classification Search
None
See application file for complete search history.

(56) References Cited

U.S. PATENT DOCUMENTS 5,295,522 A * 3/1994 DeAngelis .......... H10P 72/1916
414/217
8,240,346 B2 * 8/2012 Goto .................. H10P 72/1924
141/192

(Continued)

FOREIGN PATENT DOCUMENTS

JP 5557061 7/2014
JP 2016-192496 11/2016

(Continued)

OTHER PUBLICATIONS

International Search Report dated Aug. 30, 2022, of counterpart International Application No. PCT/JP2022/028214, along with an English translation.

*Primary Examiner* — Jethro M. Pence
(74) *Attorney, Agent, or Firm* — DLA Piper LLP (US)

(57) ABSTRACT

A purge device includes a placement section on which a container is placed by a transfer device, a purge nozzle provided in the placement section, a controller configured to perform control to execute a purging process in which purge gas is supplied through the purge nozzle into the container placed on the placement section, and an entry detection sensor configured to detect the entry of the transfer device or the container to the space directly above the placement section from a front side or a depth side of the placement section when the transfer device causes the container to enter the space directly above the placement section. Based on the detection results of the entry detection sensor, the controller performs control to discharge the purge gas from the purge nozzle before the purging process is performed.

6 Claims, 11 Drawing Sheets

(56) References Cited

U.S. PATENT DOCUMENTS

| | | | | |
|---|---|---|---|---|
| 9,257,320 | B2 * | 2/2016 | Fosnight | H10P 72/1924 |
| 9,779,973 | B2 * | 10/2017 | Murata | G01N 33/0036 |
| 9,870,936 | B2 * | 1/2018 | Fosnight | H10P 72/1924 |
| 9,875,921 | B2 * | 1/2018 | Bachlechner | H10P 72/1924 |
| 9,895,723 | B2 * | 2/2018 | Iwamoto | B08B 5/00 |
| 9,929,033 | B2 * | 3/2018 | Emoto | H10P 72/1924 |
| 9,997,387 | B2 * | 6/2018 | Murata | H10P 72/1914 |
| 10,553,467 | B2 * | 2/2020 | Chen | H10P 72/1924 |
| 10,610,905 | B2 | 4/2020 | Tsubaki et al. | |
| 10,707,108 | B2 * | 7/2020 | Fosnight | H10P 72/1924 |
| 10,766,056 | B2 * | 9/2020 | Onishi | B08B 5/023 |
| 10,818,529 | B2 * | 10/2020 | Murata | H10P 72/1924 |
| 11,433,858 | B2 * | 9/2022 | Fiebrandt | B60S 1/481 |
| 11,608,229 | B2 | 3/2023 | Tsubaki et al. | |
| 11,787,370 | B2 * | 10/2023 | Fiebrandt | B60S 1/54<br>134/30 |
| 12,027,399 | B2 * | 7/2024 | Wei | H10P 72/1926 |
| 2006/0272169 | A1 * | 12/2006 | Miyajima | H10P 72/3406<br>414/217 |
| 2010/0000625 | A1 * | 1/2010 | Goto | H10P 72/1924<br>141/193 |
| 2012/0309286 | A1 * | 12/2012 | Nakano | H10P 72/1924<br>454/305 |
| 2014/0000757 | A1 * | 1/2014 | Takahara | H10P 72/1926<br>141/66 |
| 2014/0017040 | A1 | 1/2014 | Takahara et al. | |
| 2016/0358799 | A1 * | 12/2016 | Murata | H10P 72/1914 |
| 2017/0025298 | A1 | 1/2017 | Iwamoto | |
| 2017/0133254 | A1 * | 5/2017 | Murata | H10P 72/1914 |
| 2018/0247846 | A1 * | 8/2018 | Murata | H10P 72/1924 |
| 2020/0180864 | A1 * | 6/2020 | Tsubaki | B65G 1/137 |

FOREIGN PATENT DOCUMENTS

| | | |
|---|---|---|
| WO | 2017/026168 | 2/2017 |
| WO | 2019/049518 | 3/2019 |

* cited by examiner 2
4
22
61A (6)
61B (6)
18A (18)
18B (18)
31
32
33
34
B
F
H
Z
Y
X
8
11
12
16

PURGE DEVICE

TECHNICAL FIELD

This disclosure relates to a purge device.

BACKGROUND

A purge device is known that includes a placement section on which a container is placed by a transfer device, a purge nozzle provided in the placement section, and a controller to execute a purging process, the purging process supplying purge gas through the purge nozzle into the container placed in the placement section. In such a purge device, a pre-purging process (cleaning of the purge nozzle) may be performed to discharge purge gas from the purge nozzle before the purging process is performed (refer to, for example, Japanese Unexamined Patent Publication No. 5557061).

In the purge device described above, for example, the pre-purging process may start too early, which may increase consumption of purge gas in the pre-purging process.

Therefore, it could be helpful to provide a purge device capable of suppressing the consumption of purge gas in the pre-purging process.

SUMMARY

We provide a purge device that includes: a placement section on which a container is placed by a transfer device; a purge nozzle provided in the placement section; a controller configured to perform control to execute a purging process in which purge gas is supplied through the purge nozzle into the container placed on the placement section; and an entry detection sensor configured to detect an entry of the transfer device or the container to a space directly above the placement section when the transfer device causes the container to enter the space directly above the placement section from a front side or a depth side of the placement section, in which the controller performs control to discharge the purge gas from the purge nozzle before the purging process is performed based on a detection result of the entry detection sensor.

With this purge device, the pre-purging process can be performed based on a timing of the transfer device or container entering the space directly above the placement section, thereby making it possible to perform the pre-purging process immediately before the container is placed on the placement section. With this configuration, for example, the pre-purging process is not started too early and it is possible to suppress the consumption of purge gas in the pre-purging process. In addition, to perform the pre-purging process, the pre-purging process does not need to be triggered by, for example, a control command on the transfer device side or the like, but the pre-purging process can be performed only by control on the purge device side.

The purge device may further include a loading sensor configured to detect a container having been placed on the placement section, and the controller may perform control to execute the purging process based on the detection result of the loading sensor. In this example, the purging process can be performed following the pre-purging process by control on the purge device side.

The placement section may be a shelf plate suspended by a plurality of suspension members from a ceiling section in a storage rack, the entry detection sensor includes a light projector configured to emit light and a light receiver configured to receive light from the light projector, and either one of the light projector and the light receiver may be attached to the suspension member located on a front side of the placement section, and either one of the projector and the light receiver may be attached to the suspension member located on the depth side of the placement section. In this example, the light projector and the light receiver can be used as entry detection sensors to reliably detect the entry of the transfer device or the container to the space directly above the placement section with a simple configuration.

The placement section may be a shelf plate suspended by a plurality of suspension members from a ceiling section in a storage rack, the entry detection sensor includes a light projector/receiver configured to emit light and receive reflected light reflected by a reflector of the transfer device in response to the emission, and the light projector/receiver may be attached to any of the plurality of suspension members. In this example, the light projector/receiver can be used as the entry detection sensor to reliably detect the entry of the transfer device or the container to the space directly above the placement section with a simple configuration.

The entry detection sensor may detect an entry of the transfer device to the space directly above the placement section. In this example, compared to detecting an entry of the container to the space directly above the placement section, transfer of the container with respect to the placement section can be grasped more quickly.

The purge device may include an approach detection sensor configured to detect the transfer device or the container approaching the placement section from the space directly above the placement section. In this example, the pre-purging process that is being performed, for example, can be controlled in response to a timing of the transfer device or the container approaching the placement section from the space directly above the placement section.

It is thus possible to provide a purge device capable of suppressing the consumption of purge gas in the pre-purging process.

BRIEF DESCRIPTION OF THE DRAWINGS

FIG. 6(*b*) is a schematic side view illustrating a process continued from FIG. 6(*a*).

FIG. 7(*b*) is a schematic side view illustrating a process continued from FIG. 7(*a*).

FIG. 8(*b*) is another schematic side view explaining the pre-purging sensor of FIG. 8(*a*).

FIG. 9(*b*) is another schematic side view explaining the pre-purging sensor of FIG. 9(*a*).

FIG. 10(*b*) is another schematic side view explaining the pre-purging sensor of FIG. 10(*a*).

REFERENCE SIGNS LIST

Figure 1:
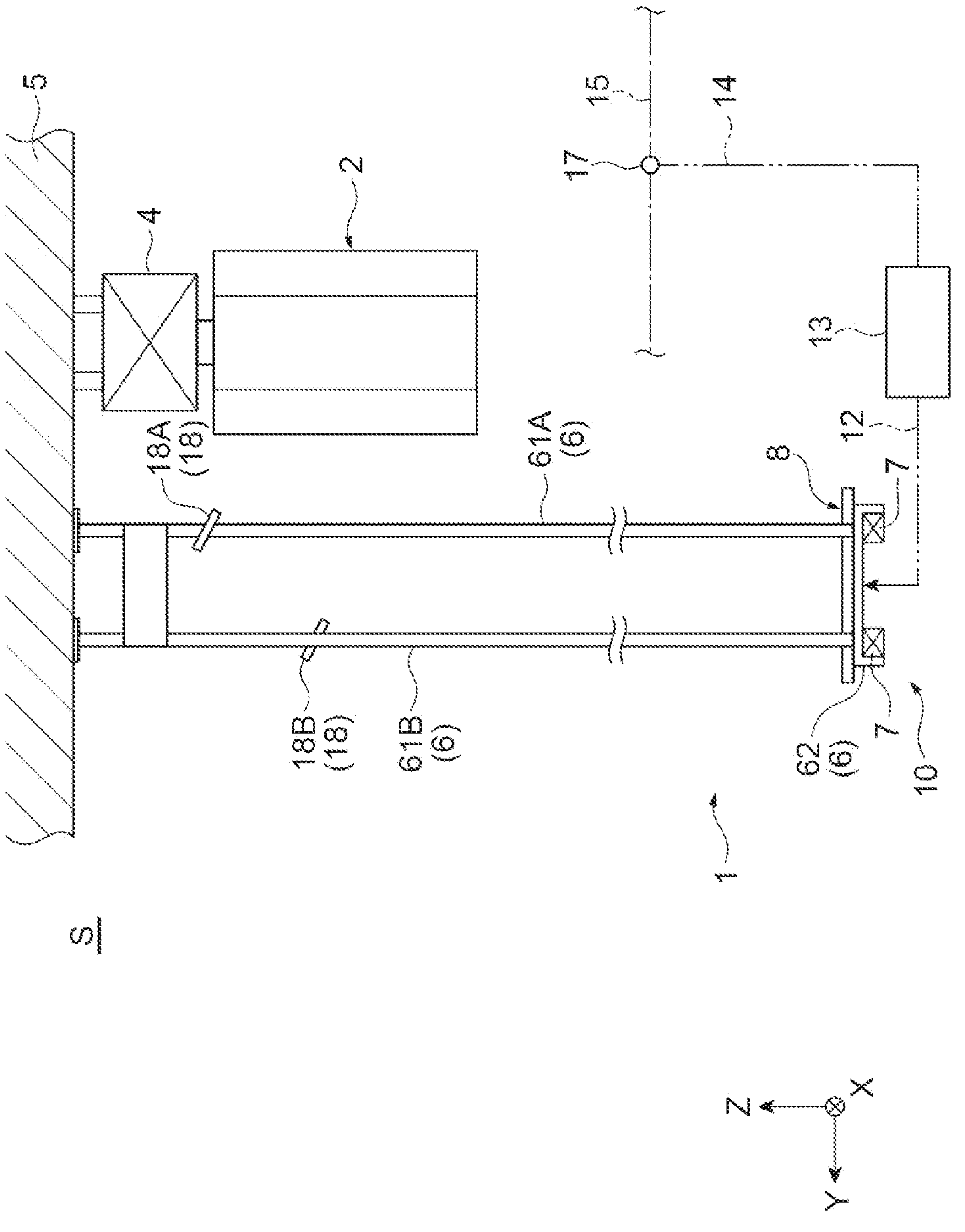
FIG. 1 is a schematic side view illustrating a storage rack provided with a purge device according to an example.

1 . . . storage rack
5 . . . ceiling section
8 . . . shelf plate (placement section)
10 . . . purge device
11 . . . purge nozzle
13 . . . gas control device (controller)
16 . . . loading sensor
18, 28 . . . pre-purging sensor (entry detection sensor)
18A . . . light projector
18B . . . light receiver
30 . . . transfer device
38, 48 . . . pre-purging sensor (approach detection sensor)
61A, 61B . . . suspension member
F . . . container

DETAILED DESCRIPTION

Examples of our purge devices will be described below with reference to the drawings. In the description of the drawings, like numerals indicate like components, and overlapping description will be omitted. Terms "X direction," "Y direction," and "Z direction" are based on directions in the drawings and are for convenience only.

Figure 2:
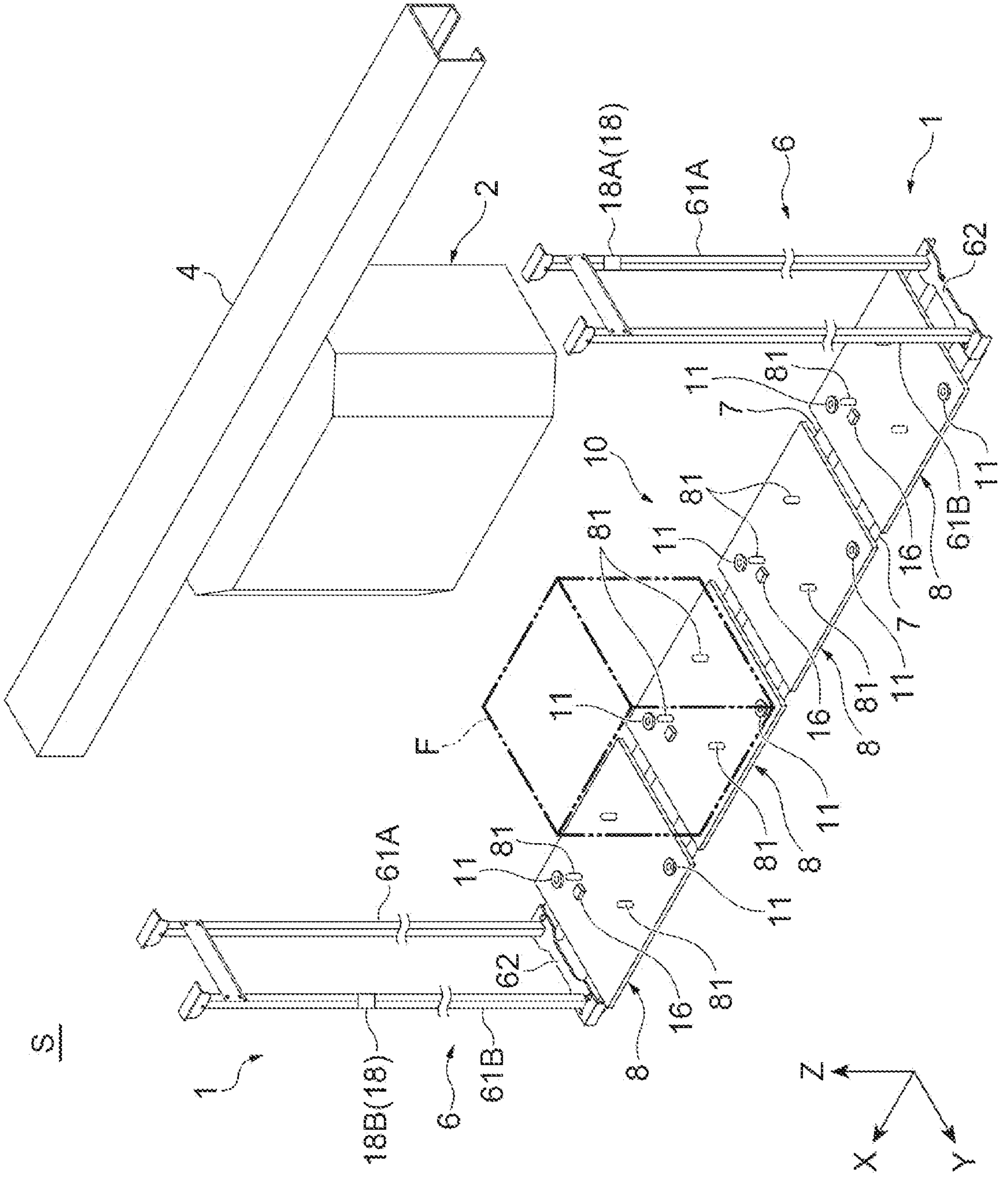
FIG. 2 is a perspective view illustrating a storage rack in FIG. 1.
Figure 3:
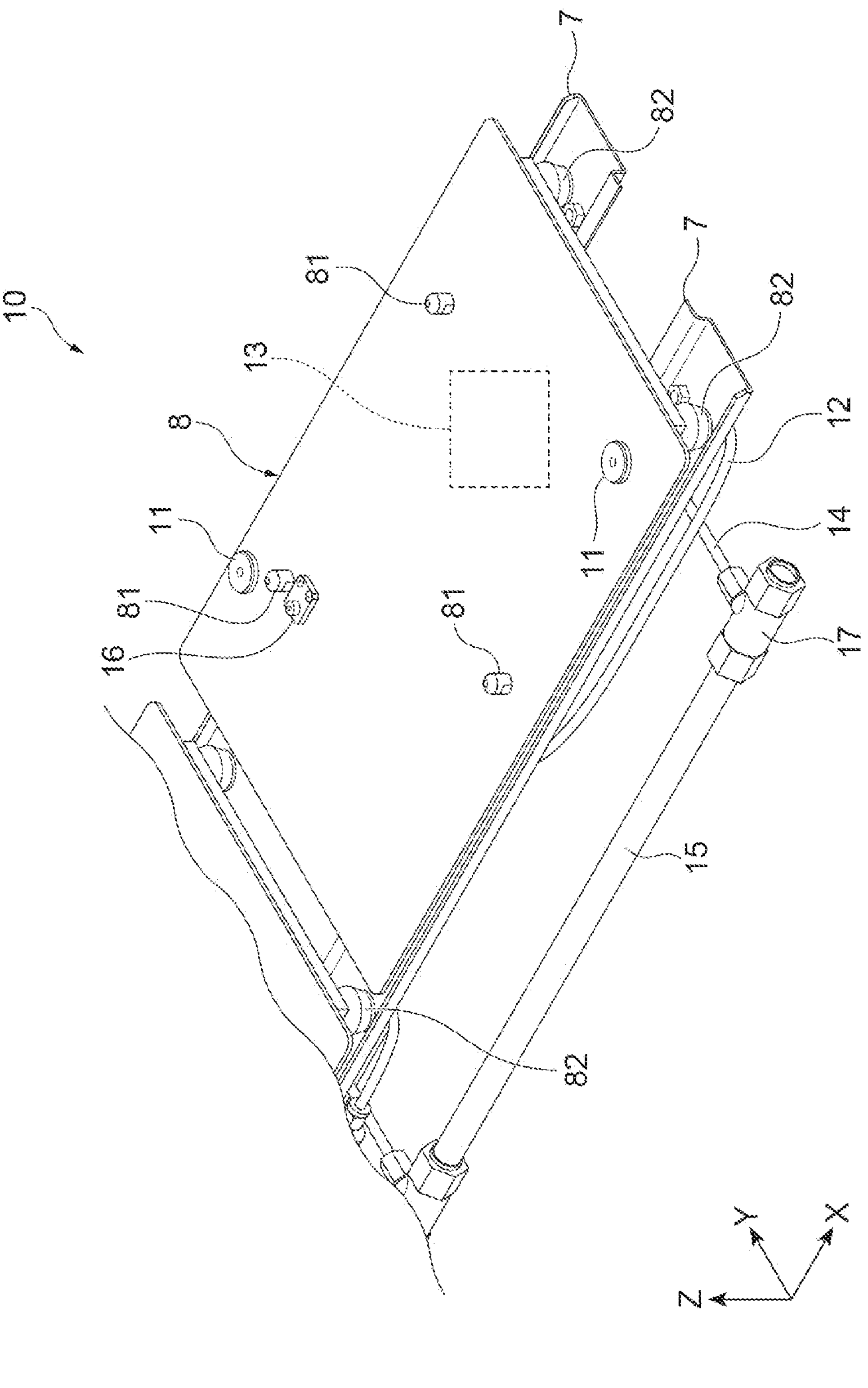
FIG. 3 is perspective view illustrating a structure around shelf plates of the storage rack in FIG. 1.

As illustrated in FIGS. 1, 2, and 3, a purge device 10 according to an example is a device provided in a storage rack 1 and supplies purge gas such as nitrogen to a container F stored in the storage rack 1. The storage rack 1 is disposed along a track 4 of an overhead transport vehicle 2 included in a semiconductor conveyance system S in a semiconductor manufacturing plant, for example. The container F is, for example, a front opening unified pod (FOUP) or a reticle pod or the like. The storage rack 1 temporarily stores the container F. The storage rack 1 may be a side track buffer (STB) disposed on a side of the track 4. The storage rack 1 is configured to purge the inside of the container F with purge gas.

As illustrated in FIGS. 1 and 2, the storage rack 1 has, for example, two base frames 6 suspended from a ceiling section 5 and two beam members 7 bridged over the two base frames 6. Each of the base frames 6 has two suspension members 61A, 61B that are suspended from the ceiling section 5 and extend in the Z direction that is a vertical direction, and one supporting member 62 that is bridged over lower ends of the suspension members 61A, 61B and extends in the direction Y that is a horizontal direction. The beam members 7 are attached to lower surfaces of the support members 62 of the two base frames 6. The beam member 7 is a member made of grooved steel having a cross section of a C shape, for example. The beam members 7 extend parallel to each other in the X direction that is a horizontal direction. The two beam members 7 are spaced apart in the Y direction.

In the storage rack 1, shelf plates 8 of a flat shape is attached on the beam members 7. Each shelf plate 8 is a purging shelf that includes a plate member of a rectangular shape that is substantially the same as a bottom surface of the container F or somewhat smaller than the bottom surface of the container F. The container F is placed on the shelf plate 8 by the transfer device 30 (described later) of the overhead transport vehicle 2. The shelf plate 8 is included in a placement section suspended from the ceiling section 5 by a plurality of the suspension members 61A, 61B. The shelf plate 8 extends horizontally, for example. Three positioning pins 81 for positioning the container F are attached on the shelf plate 8. The three positioning pins 81 are provided in a manner of protruding on the shelf plate 8. The positioning pin 81 is inserted into a groove or a hole formed in the bottom surface of the container F placed on the shelf plate 8. The shelf plate 8 is supported on the beam member 7 via an elastic body 82.

In an example illustrated in the figure, a negative (minus) side in the Y direction at the shelf plate 8 corresponds to the front side of the shelf plate 8, and a positive (plus) side in the Y direction at the shelf plate 8 corresponds to the depth side of the shelf plate 8. The front side and the depth side correspond to one side and the other side of sides of the track 4 (the sides along a traveling direction of the overhead transport vehicle 2, in the horizontal direction perpendicular to an extending direction of the track 4), respectively.

The purge device 10 includes the shelf plate 8 described above, a purge nozzle 11, first piping 12, a gas control device (controller) 13, second piping 14, main piping 15, and a loading sensor 16. The purge nozzle 11 is provided in the shelf plate 8. The purge nozzle 11 is a nozzle configured to supply gas into the container F. The purge nozzle 11 protrudes upward from a placement surface (top surface) of the shelf plate 8. The purge nozzle 11 is connected to an introduction hole in the bottom surface of the container F placed on the purge nozzle 11. A plurality of the purge nozzles 11 are provided.

The first piping 12 is a tubular member that connects the purge nozzle 11 to the gas control device 13. The gas control device 13 is a device configured to control a flow rate of the purge gas. The gas control device 13 is attached at an appropriate position on the storage rack 1. The gas control device 13 has a flow controller, a control board, a regulator, a solenoid valve and the like (not all illustrated). The gas control device 13 performs control to execute the purging process in which the purge gas is supplied into the container F placed on the shelf plate 8 through the purge nozzle 11, and the pre-purging process (cleaning process to blow off dust adhering to the purge nozzles 11) in which the purge gas is discharged from the purge nozzles 11 before the purging process is performed.

The second piping 14 is a pipe member that connects the gas control device 13 to the main piping 15. The main piping 15 is connected to a supply source of the purge gas. The main piping 15 is a pipe member formed of metal such as stainless steel or the like, or resin such as fluoroplastic or the like. The main piping 15 is connected to the second piping 14 via a branch 17. The loading sensor 16 is a sensor configured to detect that the container F is placed on the shelf plate 8. The loading sensor 16 is connected to the gas control device 13 and outputs detection results to the gas control device 13. The loading sensor 16 is disposed at a position that is close to one positioning pin 81. As the loading sensor 16, for example, a contact sensor that turns ON upon contact with the bottom surface of the container F and a proximity sensor that turns ON upon approach to the bottom surface of the container F can be used.

Figure 4:
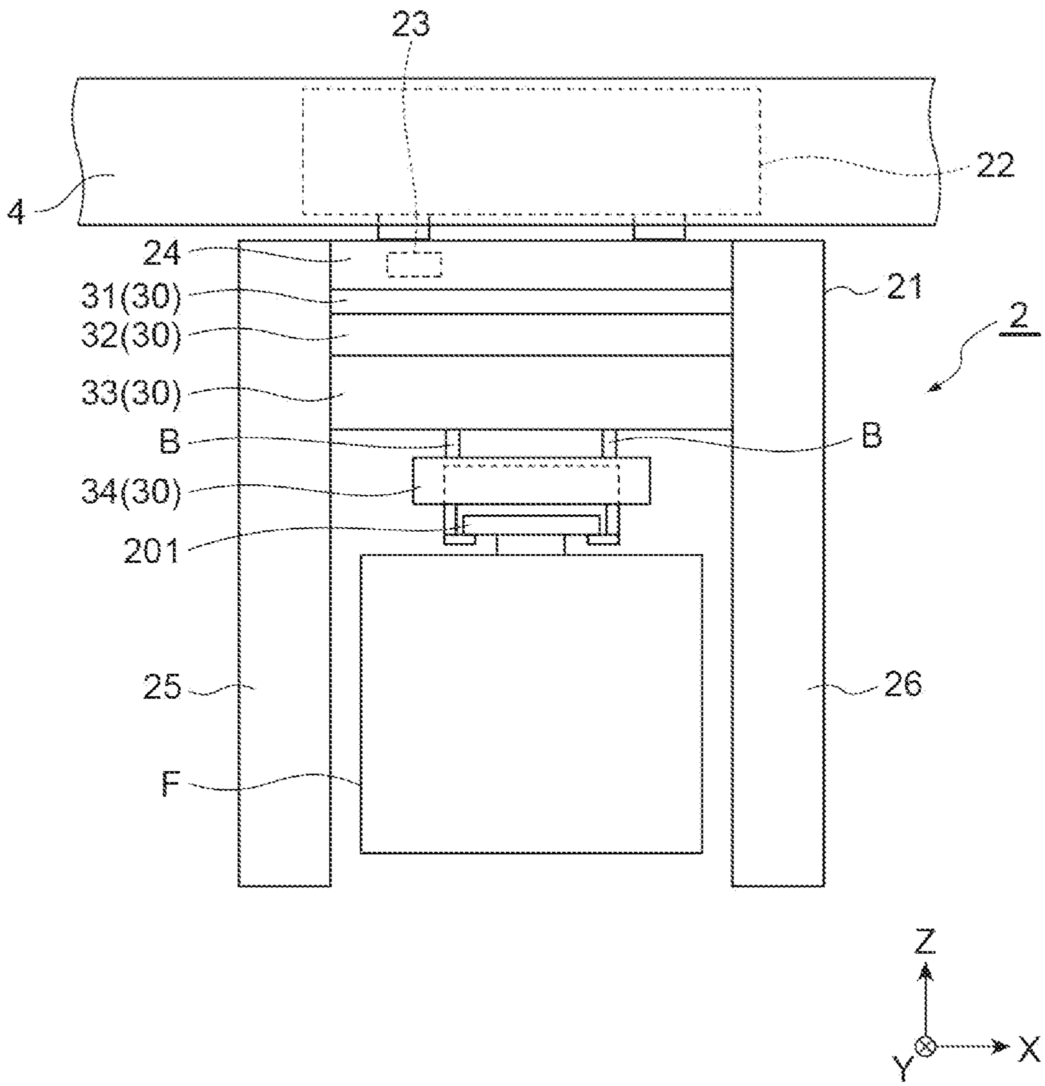
FIG. 4 is a front view illustrating an overhead transport vehicle in FIG. 1.

As illustrated in FIGS. 2 and 4, the overhead transport vehicle 2 travels along the track 4 laid near the ceiling section 5. The track 4 forms a traveling path for the overhead transport vehicle 2. The overhead transport vehicle 2 transports the container F and transfers the containers F to the shelf plate 8 of the storage rack 1. The overhead transport vehicle 2 includes a frame unit 21, a traveling unit 22, a transfer device 30, and a transport vehicle controller 23. The frame unit 21 has a center frame 24, a front frame 25, and a rear frame 26. The front frame 25 extends from the end to below the front side (the front side in the traveling direction of the overhead transport vehicle 2) in the center frame 24. The rear frame 26 extends from the end to below the rear end (the rear side in the traveling direction of the overhead transport vehicle 2) in the center frame 24.

The traveling unit 22 is disposed on an upper side of the center frame 24. The traveling unit 22, for example, travels along the track 4 by receiving supply of electric power from a high-frequency current line laid along the track 4 in a non-contact manner. The transfer device 30 is a device configure to transfer the container F to and from the shelf plate 8, and includes a lateral unit 31, a theta unit 32, an elevation drive unit 33, and a holding unit 34.

The lateral unit 31 is disposed below the center frame 24. The lateral unit 31 is driven to slide in the Y direction (sides along the traveling direction of the overhead transport vehicle 2) and moves the theta unit 32, the elevation drive unit 33, and the holding unit 34 in the Y direction. The theta unit 32 is disposed below the lateral unit 31. The theta unit 32 rotates the elevation drive unit 33 and the holding unit 34 within a horizontal plane.

The elevation drive unit 33 is located below the theta unit 32. The elevation drive unit 33 elevates and lowers the holding unit 34 by unrolling and winding a plurality of belts (hanging members) B connected to the holding unit 34. The holding unit 34 is disposed below the elevation drive unit 33. The holding unit 34 is provided to be elevated and lowered by the elevation drive unit 33. The holding unit 34 holds a flange 201 of the container F. The transport vehicle controller 23 is disposed on the center frame 24. The transport vehicle controller 23 is an electronic control unit, an electronic control unit including a central processing unit (CPU), a read only memory (ROM), a random access memory (RAM) and the like. The transport vehicle controller 23 controls each part of the overhead transport vehicle 2.

As illustrated in FIGS. 1 and 2, the purge device 10 according to the example includes a pre-purging sensor 18. The pre-purging sensor 18 is an entry detection sensor configured to detect the entry of the transfer device 30 to the space directly above the shelf plate 8 when the transfer device 30 causes the container F to enter the space directly above the shelf plate 8 from the front side of the shelf plate 8. The space directly above the shelf plate 8 corresponds, for example, to a space directly above the shelf plate 8, a space straight up against the shelf plate 8, and a space overlapping the shelf plate 8 when viewed from above. The pre-purging sensor 18 here can detect the lateral unit 31 (part of the transfer device 30) that slides along the horizontal direction during transfer. The pre-purging sensor 18 is connected to the gas control device 13 and outputs a detection result to the gas control device 13.

The pre-purging sensor 18 has a light projector 18A configured to emit light and a light receiver 18B configured to receive light from the light projector 18A. The light projector 18A is attached to the suspension member 61A disposed on the front side of the shelf plate 8 in one of the two base frames 6. The light receiver 18B is attached to the suspension member 61B disposed at the depth side of the shelf plate 8 in the other of the two base frames 6.

In one example, the light projector 18A is disposed above the lateral unit 31. The light receiver 18B is disposed below lateral unit 31. The light projector 18A and the light receiver 18B emit and receive light such that the light intersects the shelf plate 8 when viewed from above. The light projector 18A and the light receiver 18B emit and receive light such that the light intersects all of the X, Y, and Z directions. The light projector 18A is disposed such that light falls on the lateral unit 31 that is sliding or in an initial phase of sliding start during the transfer. The pre-purging sensor 18 detects the entry of the transfer device 30 to the space directly above the shelf plate 8 when the light from the light projector 18A is blocked and not received by the light receiver 18B. The pre-purging sensor 18 does not detect the entry of the transfer device 30 to the space directly above the shelf plate 8 (in other words, detects the transfer device 30 not entering) when the light from the light projector 18A is not blocked and is received by the light receiver 18B. The light projector 18A and the light receiver 18B are not particularly limited, and various known light projectors and light receivers may be used.

Figure 5:
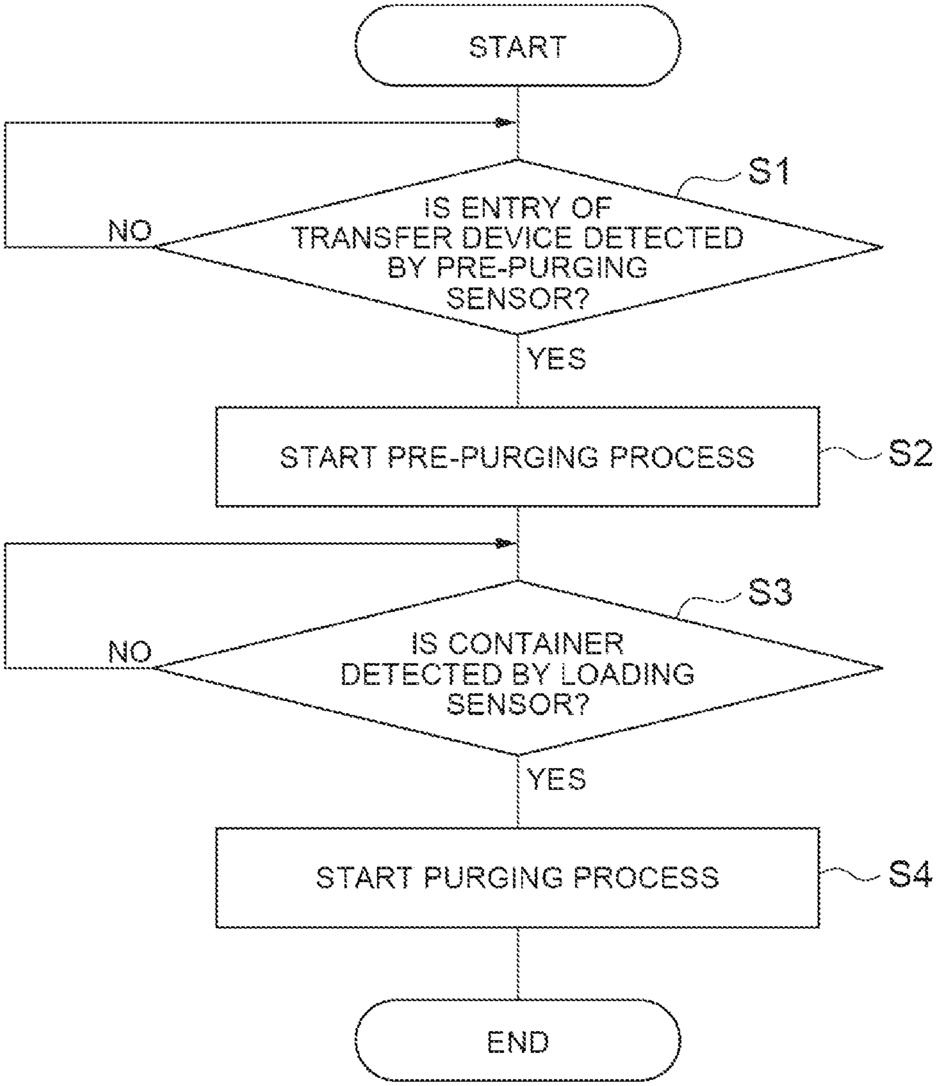
FIG. 5 is a flowchart representing a process performed by a gas control device of the purge device in FIG. 1.

Based on the detection result of the pre-purging sensor 18, the gas control device 13 performs control to discharge the purge gas from the purge nozzle 11 (perform the pre-purging process) before the purging process is performed. Furthermore, the gas control device 13 performs control to execute the purging process based on the detection result of the loading sensor 16. For example, the gas control device 13 executes the following processes. In other words, as illustrated in FIG. 5, whether the pre-purging sensor 18 has detected the entry of the transfer device 30 to the space directly above the shelf plate 8 is determined (step S1). If it is determined to be YES in step S1 described above, the pre-purging process is started to discharge purge gas of a first flow rate from the purge nozzle 11 (step S2). If it is determined to be NO in step S1 described above, the process returns to step S1 described above. After the step S2 described above, whether the loading sensor 16 has detected the loading of the container F onto the shelf plate 8 is determined (step S3). If it is determined to be YES in step S3 described above, the purging process is started in which a second flow rate of purge gas is supplied into the container F placed on the shelf plate 8 through the purge nozzle 11 (step S4). If it is determined to be NO in step S3 described above, the process returns to step S3 described above.

The first flow rate of the pre-purging process and the second flow rate of the purging process may be the same or different. The pre-purging process may end at a timing of the start of the purging process (e.g., YES in step S3 described above) or before the purging process starts (e.g., before step S3 described above). When the first and the second flow rates are the same, the pre-purging process and the purging process may be performed without interruption of the processes.

Figure 6:
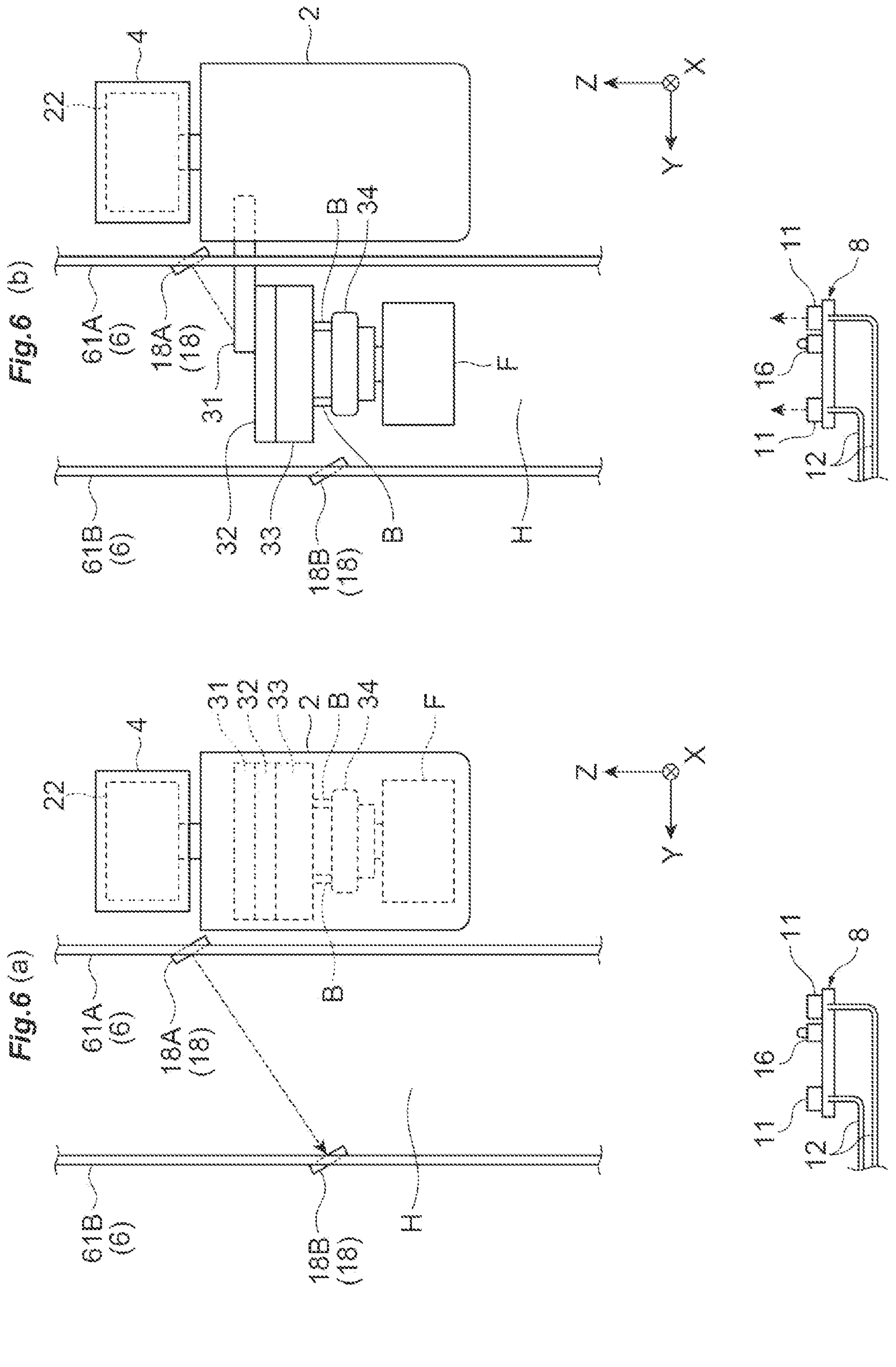
FIG. 6(*a*) is a schematic side view explaining an example of the pre-purging process and the purging process when the container is transferred from the overhead transport vehicle to the shelf plate of the storage rack.

FIGS. 6(*a*), 6(*b*), 7(*a*), and 7(*b*) are schematic side views illustrating examples of the pre-purging process and the purging process when the container F is transferred from the overhead transport vehicle 2 to the shelf plate 8 of the storage rack 1. For example, when the container F is transferred from the overhead transport vehicle 2 to the shelf plate 8 of the storage rack 1, as illustrated in FIG. 6(*a*), the overhead transport vehicle 2 holding the container F stops with respect to a shelf plate 8 that is empty, at a position that is close to a front side of the shelf plate 8. At this time, purge gas is not discharged from the purge nozzle 11 on shelf plate 8.

Then, as illustrated in FIG. 6(*b*), the lateral unit 31 is slid in the Y direction to move the theta unit 32, the elevation drive unit 33, the holding unit 34, and the container F from the front side to the depth side. With this configuration, the lateral unit 31, the theta unit 32, the elevation drive unit 33, the holding unit 34, and the container F enter a directly above space H that is a space directly above the shelf plate 8 along the Y direction, and at least part thereof are positioned inside the directly above space H. In this example, in an initial stage of the sliding operation of the lateral unit 31, the lateral unit 31 blocks light from the light projector 18A of the pre-purging sensor 18, and the start of entry of the lateral unit 31 to the directly above space H (start of transfer by the transfer device 30) is detected by the pre-purging sensor 18. As a result, the detection triggers starting the pre-purging process described above.

Figure 7:
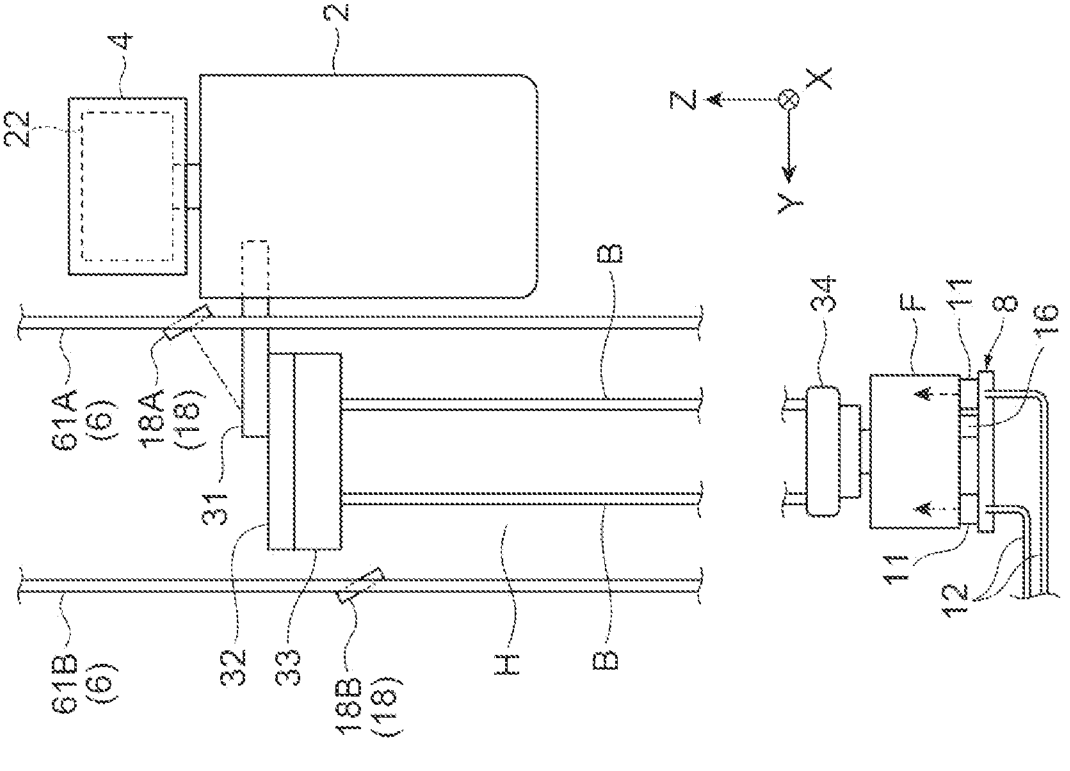
FIG. 7(*a*) is a schematic side view illustrating a process continued from FIG. 6(*b*).
Figure 7:
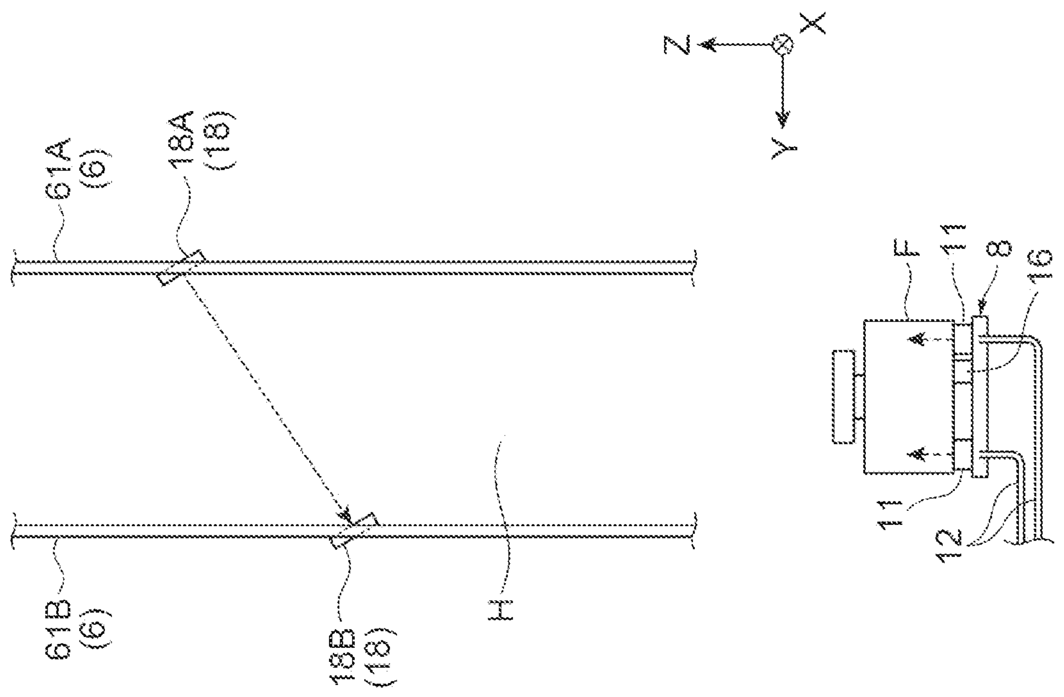

Then, as illustrated in FIG. 7(*a*), the elevation drive unit 33 is driven to lower the holding unit 34 and place the container F on the shelf plate 8. At this time, the container F comes into contact with the loading sensor 16 and the loading sensor 16 turns ON, detecting the placement of the container F on the shelf plate 8. As a result, the detection triggers starting the purging process described above. The holding unit 34 then releases the hold of the flange 201 of the container F, and the holding unit 34 is raised to an ascending end by the elevation drive unit 33. By driving and sliding the lateral unit 31, the theta unit 32, the elevation drive unit 33, and the holding unit 34 are moved from the depth side to the front side, and released from the directly above space H. Then, as illustrated in FIG. 7(*b*), the overhead transport vehicle 2, which does not hold the container F, travels toward another transfer source, for example.

As described above, the purge device 10 can perform the pre-purging process based on the timing of the transfer device 30 entering the space directly above the shelf plate 8, making it possible to perform the pre-purging process from right before the container F is placed on the shelf plate 8. With this configuration, for example, the pre-purging process is not started too early and it is possible to suppress the consumption of purge gas in the pre-purging process. The pre-purging process for cleaning the purge nozzle 11 or other purposes can be reliably performed with a required minimum amount of purge gas.

In addition, the purge device 10 does not need to be triggered by a control command (such as each control timing included in control commands) on the transfer device 30 side, for example, to perform the pre-purging process, and the pre-purging process can be performed only by control on the purge device 10 side, which is a local side. In other words, it is possible to start the pre-purging process at the timing immediately before the container F is placed on the shelf plate 8, without a higher-level control command. When the overhead transport vehicle 2 transfers the container F to the shelf plate 8 based on the user's remote operation, this example is particularly effective because the starting of the pre-purging process can be controlled only on the purge device 10 side.

The purge device 10 further includes a loading sensor 16 configured to detect that the container F has been placed on the shelf plate 8. The gas control device 13 performs the purging process based on the detection results of the loading sensor 16. In this example, the purging process can be performed following the pre-purging process by control on the purge device 10 side.

In the purge device 10, the shelf plate 8 is suspended from the ceiling section 5 at the storage rack 1 by the plurality of suspension members 61A, 61B. The light projector 18A of the pre-purging sensor 18 is attached to the suspension member 61A disposed on the front side of the shelf plate 8, and the light receiver 18B of the pre-purging sensor 18 is attached to the suspension member 61B disposed on the depth side of the shelf plate 8. In this example, the light projector 18A and the light receiver 18B can be used as the pre-purging sensor 18, which is an entry detection sensor, to reliably detect the entry of the transfer device 30 to the space directly above the shelf plate 8 with a simple configuration.

In the purge device 10, the pre-purging sensor 18 detects the entry of the transfer device 30 to the space directly above the shelf plate 8. In this example, it is possible to grasp the transfer of the container F to the shelf plate 8 more quickly than when detecting the entry of the container F to the space directly above the shelf plate 8.

One example has been described as above, but this disclosure is not limited thereto.

Figure 8:
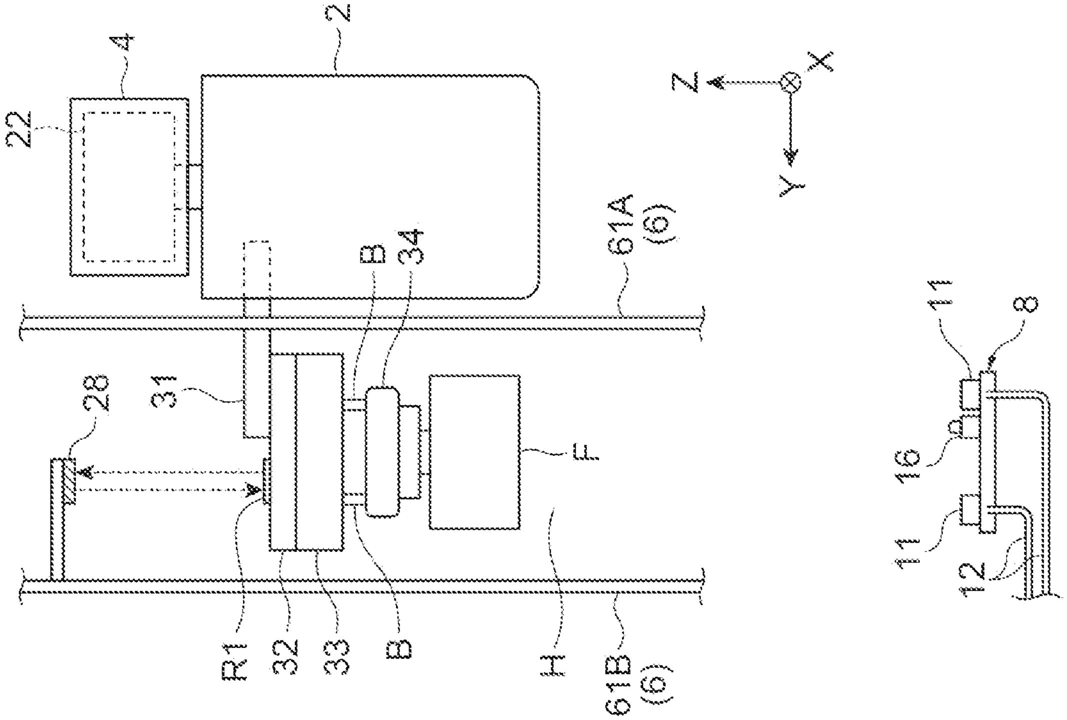
FIG. 8(*a*) is a schematic side view explaining a pre-purging sensor according to a modification.
Figure 8:
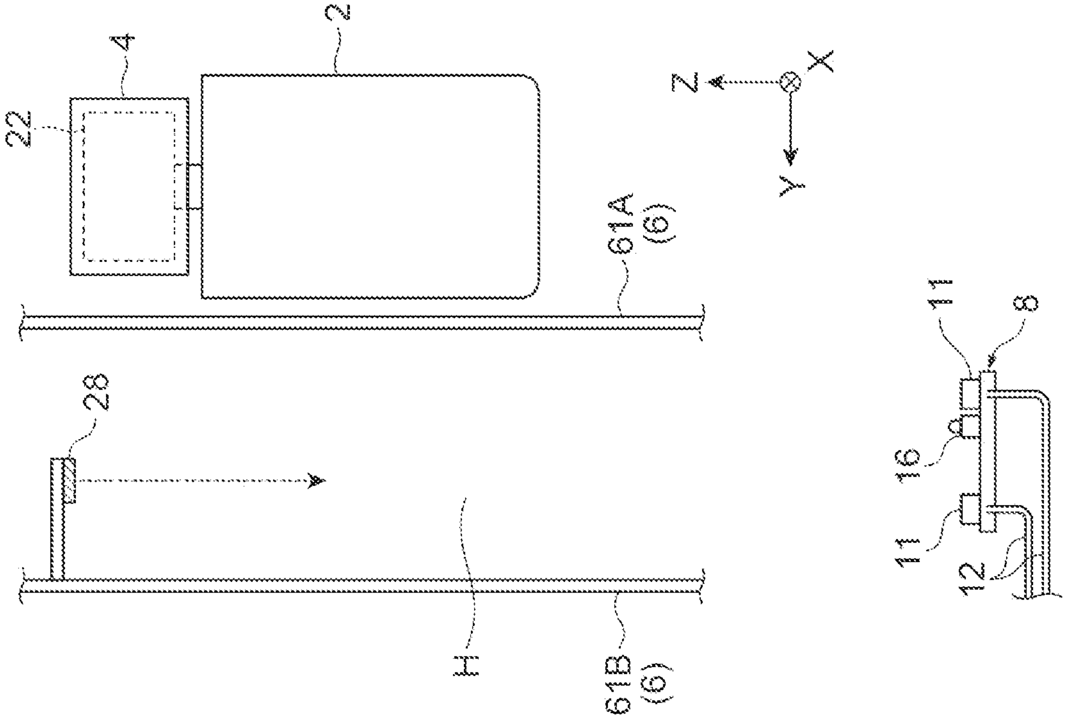

In the example described above, the entry detection sensor may include a light projector/receiver configured to emit light and receive reflected light reflected by the reflector of the transfer device 30 in response to the emission. The light projector/receiver may be attached to either of the plurality of suspension members 61A, 61B. In this example, the light projector/receiver can be used to reliably detect the entry of the transfer device 30 to the space directly above the shelf plate 8 with a simple configuration. As an example of such an entry detection sensor, a pre-purging sensor 28 illustrated in FIGS. 8(A) and 8(*b*), for example, can be used.

The pre-purging sensor 28 includes a light projector/receiver provided at a position higher than the transfer device 30 is in the suspension member 61B and configured to emit light downward. A reflector R1, such as a mirror, is provided on the top surface of the theta unit 32. In this example, when the lateral unit 31 slides and the theta unit 32, the elevation drive unit 33, the holding unit 34, and the container F enter the space directly above the shelf plate 8 from the front side, light emitted downward from the pre-purging sensor 28 is reflected by the reflector R1 and the reflected light is received by the pre-purging sensor 28. Therefore, based on whether or not the reflected light is detected by the pre-purging sensor 28, the entry of the transfer device 30 to the space directly above the shelf plate 8 can be reliably detected. The reflector R1 may be disposed on the shelf plate 8 to detect the entry of the transfer device 30 by allowing the lateral unit 31 or the like that has entered the space directly above the shelf plate 8 to block light from the light projector 18A to not be received by the light receiver 18B. In addition, the entry of the transfer device 30 may be detected by detecting, with a distance sensor or the like, the lateral unit 31 or the like that has entered the space directly above the shelf plate 8 without using the reflector R1.

Figure 9:
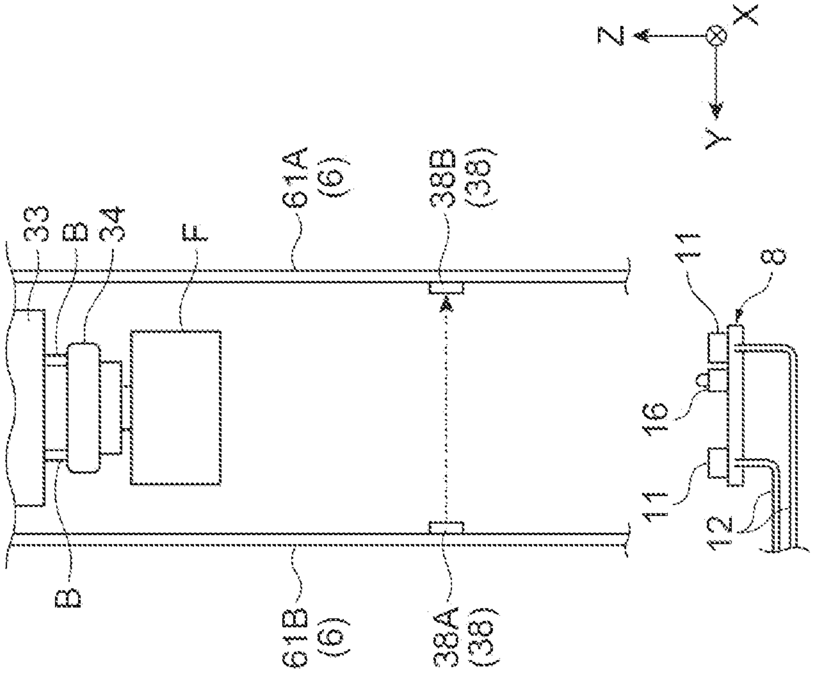
FIG. 9(*a*) is a schematic side view explaining the pre-purging sensor as an approach detection sensor.
Figure 9:
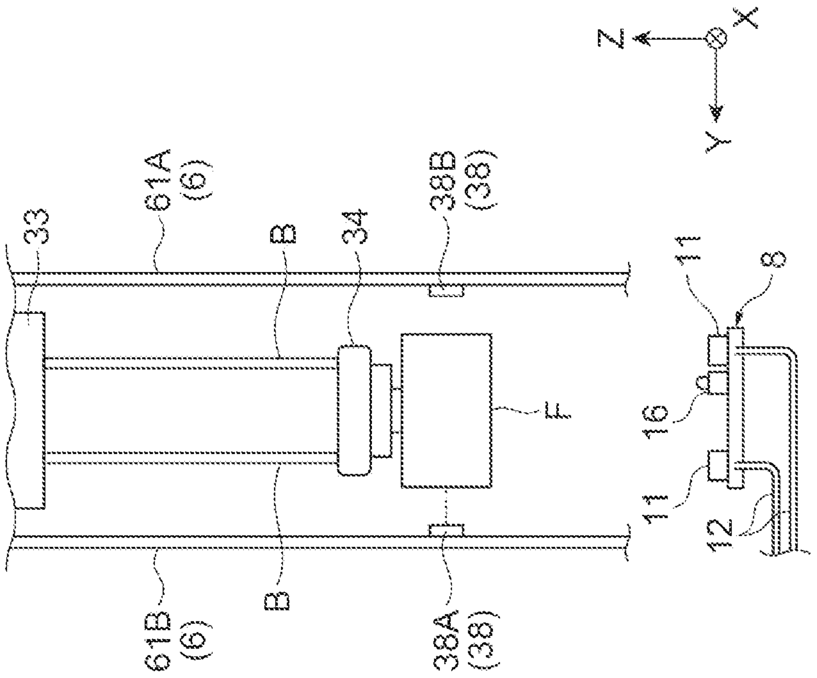

The example and the modification described above may further include an approach detection sensor configured to detect the transfer device 30 or the container F that approaches the shelf plate 8 from the space directly above the shelf plate 8. In this example, the pre-purging process that is being performed can be controlled appropriately in response to the timing of the transfer device 30 or the container F approaching the shelf plate 8 from the space directly above the shelf plate 8. For example, the approach can be used as a trigger to change the mode of the pre-purging process that is being performed. An example of the approach detection sensor may be a pre-purging sensor 38 illustrated in FIGS. 9(*a*) and 9(*b*), for example.

The pre-purging sensor 38 includes a light projector 38A attached to a lower portion of the suspension member 61B on the depth side of the shelf plate 8 and a light receiver 38B attached to a lower portion of the suspension member 61A disposed on the front side of the shelf plate 8. The light projector 38A and the light receiver 38B emit and receive light along the horizontal direction. In this example, when the elevation drive unit 33 is driven to lower the holding unit 34 and the transfer device 30 or the container F approaches the shelf plate 8, light from the light projector 38A is blocked so that the pre-purging sensor 38 fails to receive the light with the light receiver 38B. Therefore, based on whether or not light is detected by the pre-purging sensor 38, it is possible to reliably detect the approach of the transfer device 30 or the container F to the shelf plate 8 from the space directly above the shelf plate 8.

Figure 10:
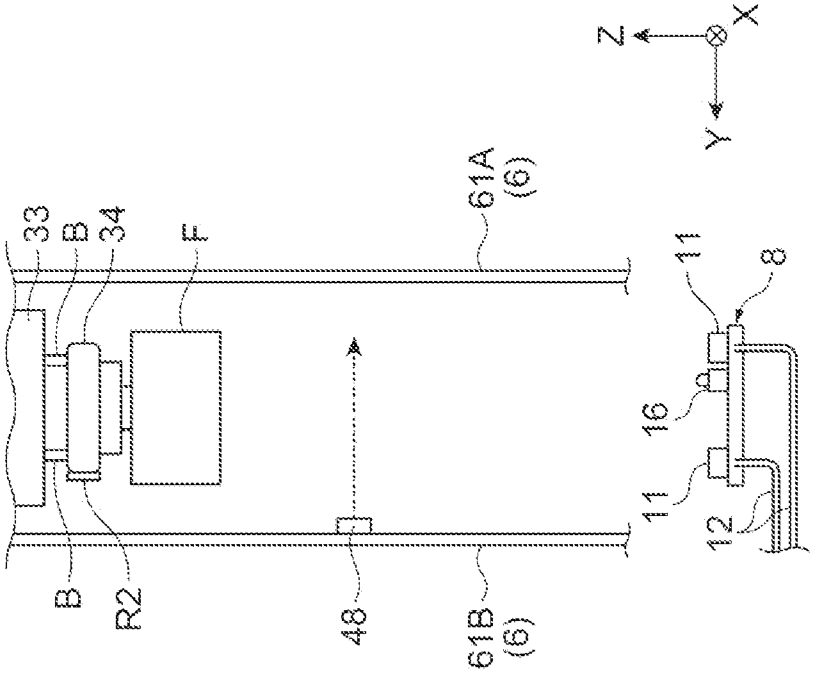
FIG. 10(*a*) is a schematic side view explaining the pre-purging sensor as an approach detection sensor.
Figure 10:
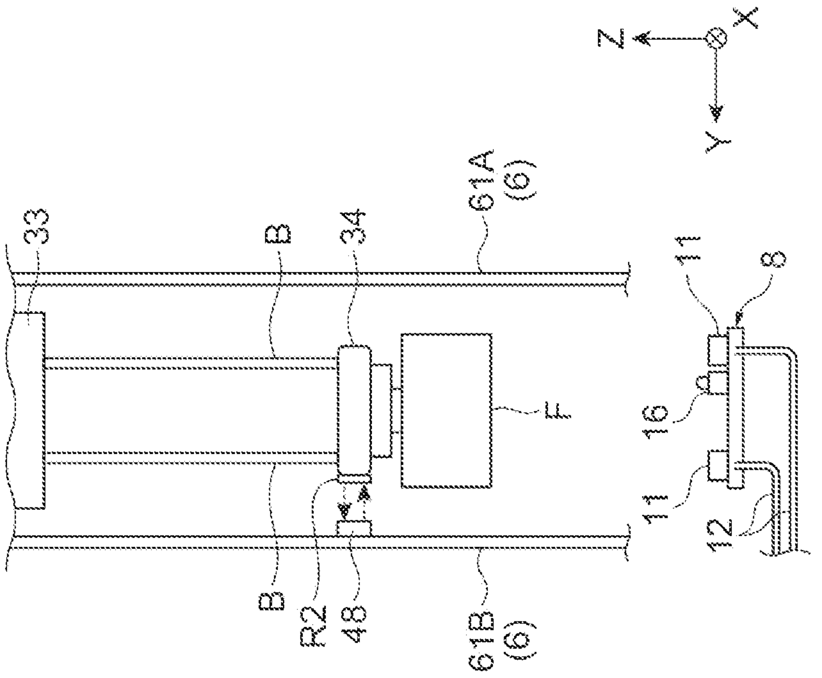

Alternatively, a pre-purging sensor 48 illustrated in FIGS. 10(*a*) and 10(*b*) may be used as an example of the approach detection sensor. The pre-purging sensor 48 includes a light projector/receiver configured to emit light toward the front side at the lower portion of the suspension member 61B. Moreover, a reflector R2, such as a mirror, is provided on a side surface of the depth side of the holding unit 34. In this example, when the elevation drive unit 33 is driven to lower the holding unit 34 and the elevation drive unit 33 approaches the shelf plate 8, light emitted from the pre-purging sensor 48 is reflected by the reflector R2, and the reflected light is received by the pre-purging sensor 48. Therefore, based on whether or not the reflected light is detected by the pre-purging sensor 48, it is possible to reliably detect the approach of the elevation drive unit 33 to the shelf plate 8 from the space directly above the shelf plate 8.

In the example and the modification described above, the entry detection sensor detects the entry of the transfer device 30 to the space directly above the shelf plate 8, but the entry detection sensor may also detect the entry of the container F to the space directly above the shelf plate 8. In the example and the modification described above, the transfer device 30 allows the container F to enter from the front side of the shelf plate 8 to the space directly above the shelf plate 8, but the transfer device 30 also may allow the container F to enter from the depth side of the shelf plate 8 to the space directly above the shelf plate 8. In the example and the modification described above, the entry detection sensor is not particularly limited, and various sensors may be used as long as the entry of the transfer device 30 or the container F to the space directly above the shelf plate 8 can be detected. In the example and the modification described above, the light projector 18A is attached to the suspension member 61A and the light receiver 18B is attached to the suspension member 61B, but the light projector 18A may be attached to the suspension member 61B and the light receiver 18B may be attached to the suspension member 61A.

Figure 11:
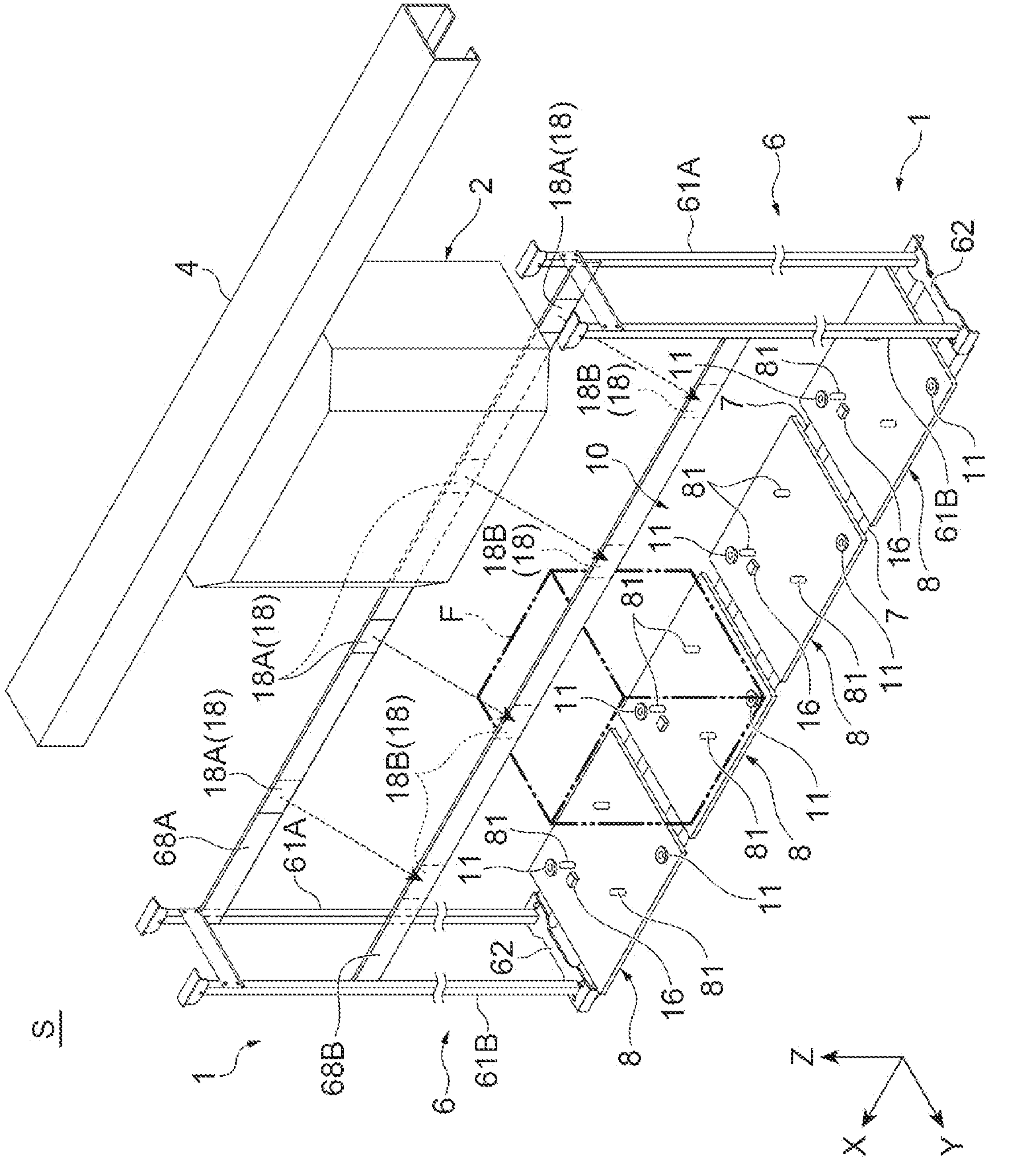
FIG. 11 is a perspective view illustrating a storage rack according to the modification.

In the example and the modification described above, as illustrated in FIG. 11, for example, a plurality pairs of the light projectors 18A and the light receivers 18B may be disposed for each of the shelf plates 8. In the example illustrated in the figure, a beam member 68A is provided extending along the X direction to bridge upper portions of a pair of the suspension members 61A, 61A that are separated from each other in the X direction. A beam member 68B extending along the X direction is provided to bridge a position lower than the beam member 68A is in a pair of the suspension members 61B, 61B separated from each other in the X direction. The light projector 18A is provided at a position corresponding to each of the shelf plates 8 in the beam member 68A, and the light receiver 18B is provided at a position corresponding to each of the shelf plates 8 in the beam member 68B.

The example and the modification described above have been described with an example of applying an aspect of the present invention to the storage rack 1 having a configuration of being suspended from the ceiling, but this disclosure may also be applied to a storage rack (purge stocker) or the like installed on the ground, for example. In the example and the modification described above, the overhead transport vehicle 2 is taken as an example of a conveyance device, but the conveyance device may be a conveyance device such as a stacker crane that travels on the ground.

The following describes the constituent features of selected configurations of our purging device.

Configuration 1

A purge device including:

a placement section on which a container is placed by a transfer device;

a purge nozzle provided in the placement section;

a controller configured to perform control to execute a purging process in which purge gas is supplied through the purge nozzle into the container placed on the placement section; and an entry detection sensor configured to detect an entry of the transfer device or the container to a space directly above the placement section when the transfer device causes the container to enter the space directly above the placement section from a front side or a depth side of the placement section, in which the controller configured to perform control, based on a detection result of the entry detection sensor, to discharge the purge gas from the purge nozzle before the purging process is performed.

Configuration 2

The purge device according to 1 further including a loading sensor configured to detect the container having been placed on the placement section, in which the controller performs control to execute the purging process based on the detection result of the loading sensor.

Configuration 3

The purge device according to 1 or 2, in which the placement section is a shelf plate suspended by a plurality of suspension members from a ceiling section in a storage rack, the entry detection sensor includes a light projector configured to emit light and a light receiver configured to receive light from the light projector, either one of the light projector and the light receiver is attached to the suspension member located on a front side of the placement section, and either one of the projector and the light receiver is attached to the suspension member located on the depth side of the placement section.

Configuration 4

The purge device according to 1 or 2, in which the placement section is a shelf plate suspended by a plurality of suspension members from a ceiling section in a storage rack, the entry detection sensor includes a light projector/receiver configured to emit light and receive reflected light reflected by a reflector of the transfer device in response to the emission, and the light projector/receiver is attached to any of the plurality of suspension members.

Configuration 5

The purge device according to any one of 1 to 4, in which the entry detection sensor detects the entry of the transfer device to the space directly above the placement section.

Configuration 6

The purge device according to any one of 1 to 5, including an approach detection sensor configured to detect the transfer device or the container approaching the placement section from the space directly above the placement section.

The invention claimed is:

1. A purge device comprising:

a placement section on which a container is placed by a transfer device;

a purge nozzle provided in the placement section;

a controller configured to control and execute a purging process in which purge gas is supplied through the purge nozzle into the container placed on the placement section; and an entry detection sensor configured to detect an entry in the horizontal direction of the transfer device or the container to a space directly above the placement section by detecting a sliding operation of the transfer device or the container in the horizontal direction, when the transfer device causes the container to enter the space directly above the placement section from a front side or a depth side of the placement section, wherein the controller is configured to control, based on a detection result of the entry detection sensor, to discharge the purge gas from the purge nozzle before the purging process is performed.

2. The purge device according to claim 1, further comprising a loading sensor configured to detect that a container having been placed on the placement section, and the controller executes the purging process based on the detection result of the loading sensor.

3. The purge device according to claim 1, wherein the placement section is a shelf plate suspended by a plurality of suspension members from a ceiling section in a storage rack, the entry detection sensor includes a light projector configured to emit light and a light receiver configured to receive light from the light projector, either one of the light projector and the light receiver is attached to the suspension member located on a front side of the placement section, and the other of the projector and the light receiver is attached to the suspension member located on the depth side of the placement section.

4. The purge device according to claim 1, wherein the placement section is a shelf plate suspended by a plurality of suspension members from a ceiling section in a storage rack, the entry detection sensor includes a light projector/receiver configured to emit light and receive reflected light reflected by a reflector of the transfer device in response to the emission, and the light projector/receiver is attached to any of the plurality of suspension members.

5. The purge device according to claim 1, wherein the entry detection sensor detects entry of the transfer device to the space directly above the placement section.

6. The purge device according to claim 1, comprising an approach detection sensor configured to detect the transfer device or the container approaching the placement section from the space directly above the placement section.

* * * * *